Feb. 14, 1961   G. B. GWILLIAM ET AL   2,971,216
APPARATUS FOR MANUFACTURING MEAT PRODUCTS
Filed Aug. 5, 1958                                 8 Sheets-Sheet 1

INVENTORS
GLENN B. GWILLIAM
HAROLD C. HOWELL, JR.
BY Strauch, Nolan & Neale
ATTORNEYS

Feb. 14, 1961  G. B. GWILLIAM ET AL  2,971,216
APPARATUS FOR MANUFACTURING MEAT PRODUCTS
Filed Aug. 5, 1958  8 Sheets-Sheet 7

INVENTORS
GLENN B. GWILLIAM
HAROLD C. HOWELL, JR.

BY Strauch, Nolan & Neale

ATTORNEYS

Feb. 14, 1961  G. B. GWILLIAM ET AL  2,971,216
APPARATUS FOR MANUFACTURING MEAT PRODUCTS
Filed Aug. 5, 1958  8 Sheets-Sheet 8

INVENTORS
GLENN B. GWILLIAM
HAROLD C. HOWELL, JR.
BY Strauch Nolan + Neale
ATTORNEYS

United States Patent Office 2,971,216
Patented Feb. 14, 1961

2,971,216

APPARATUS FOR MANUFACTURING MEAT PRODUCTS

Glenn B. Gwilliam and Harold C. Howell, Jr., both of 4611 Hill Road, Boise, Idaho Filed Aug. 5, 1958, Ser. No. 753,218

8 Claims. (Cl. 17—25)

This invention relates to the manufacture of meat products and more particularly is concerned with apparatus for the manufacture of steaks wherein a natural raw ground meat product is converted into a highly acceptable integrated steak form.

It has been proposed, in the past, to tenderize naturally tough meats by passing cut steak slices through so-called cubing machines where relatively sharp knives locally mascerate the meat to sever connecting fibers without dividing the steak into small pieces. Such apparatus, however, has not been found to be satisfactory to knead fibers of ground meat into stringy strands and to knit these strands together in order to form a final product which is coherent and natural in appearance.

With the present invention, there is contemplated a novel machine for rebuilding ground-up tough raw meat not otherwise comestible by applying a series of spaced localized compressions to the ground meat along substantially linear areas to form an intermingled coherent knitted texture of ground meat fibers.

While this device is particularly useful for rebuilding beef products, it is understood that other meats of similar texture may be similarly rebuilt into a steak or cutlet form.

With the foregoing purposes and considerations in mind, therefore, it is the major object of this invention to provide for a novel meat rebuilding machine wherein ground low grade natural raw meat is formed and rebuilt into a tender comestible steak product of coherent knitted tendril texture of generally natural steak appearance.

It is a further object of this invention to provide for a novel meat rebuilding machine wherein a stringy mass of meat fibers is formed from ground meat and effectively knitted together by subjecting the ground meat to a plurality of spaced localized compressions substantially along linear areas.

It is further a more specific object of this invention to provide in a novel meat rebuilding machine a plurality of parallel rows of dull blades movable in elliptical paths for applying spaced localized compressions to ground meat substantially linear areas to effectively knead the fibers of the ground meat into intermingled tendril structure and to bind the tendrils together.

Further objects will presently appear as the description proceeds in connection the appended claims and annexed drawings wherein:

Figure 1:
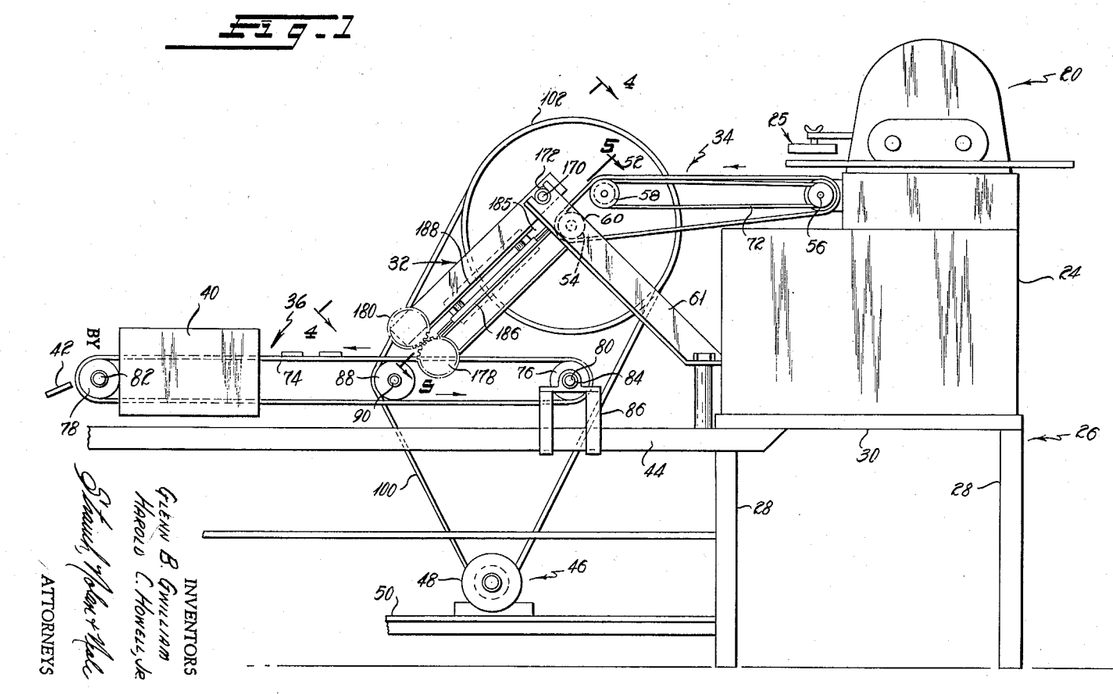
Figure 1 is a partially diagrammatic right side elevation of an apparatus for manufacturing a meat product according to the preferred embodiment of the invention.
Figure 2:
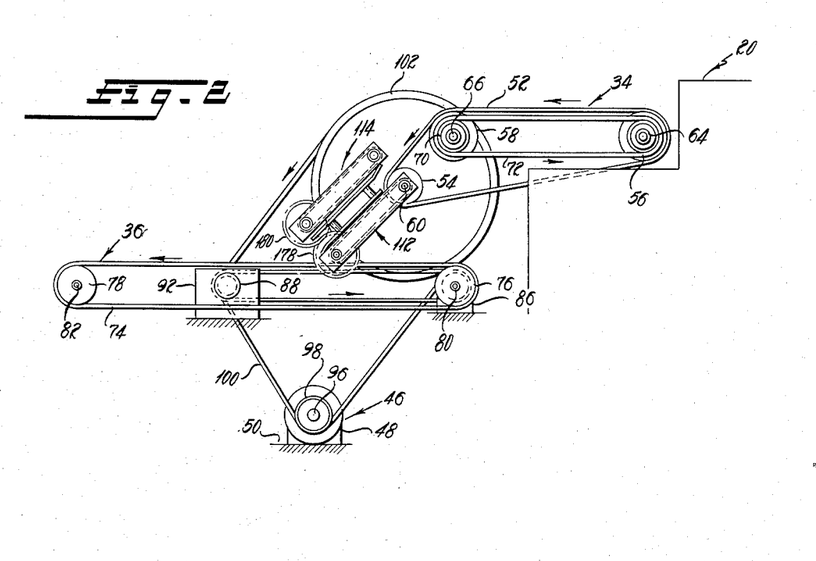
Figure 2 is a reduced scale right diagrammatic side elevation of the apparatus of Figure 1 with the framework removed.
Figure 3:
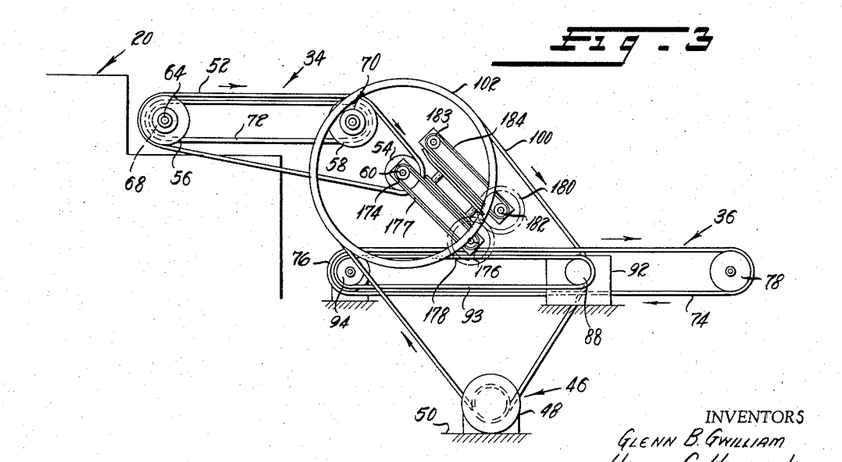
Figure 3 is a left diagrammatic side elevation of the apparatus of Figure 1 similar to Figure 2 with the framework removed.

Referring now in detail to Figures 1–3 and adverting first to the general assemblage (Figure 1), the numeral 20 designates a molding machine of any suitable standard construction such as that disclosed and described in the United States Patent Number 2,413,046. This molding machine 20 is provided with a housing 24 enclosing the molding apparatus and the driving mechanism therefor for forming ground meat patties of selected weights and sizes. Mounted to receive the measured ground meat portions discharged from the molding machine 20 is a shaping and ejecting mechanism 25 for shaping the individual ground meat portions discharged from the machine into compact patties of selected shape and size. The molding machine 20 is supported by a suitable framework 26 which may be built up from angle irons or other structural forms and comprises four vertically standing legs 28 on the top of which is secured a rectangular frame 30 by welding or other suitable means.

The ground meat patties which are ejected from the molding machine 20 are delivered at spaced intervals to the knitting and kneading machine 32 by a feed conveyor assembly indicated at 34 and each individual patty is kneaded and knitted in machine 32 as will be described. The knitting machine 32 discharges a finished meat steak product on to one end of a horizontally extending take-away belt conveyor 36 which carries a suitable paper or cellophane produce wrapping (not shown) spread over the conveyor belt and movable therewith. At the far end of the take-away conveyor 36, the wrapping paper carrying the rebuilt meat patties is severed between the patties by an automatically controlled knife mechanism 40. A ramp 42 is provided at this discharge end of conveyor 36 to transfer the meat patties to a wrapping station (not shown).

The knitting machine 32, the take-away conveyor 36, feed conveyor 34 and the knife mechanism 40 are all mounted on a suitable rigid frame extension 44 built up from suitable angle irons and which is fastened at one end to the framework 26 by suitable means and supported by suitable beams or angles (not shown) at its other end. The driving mechanism for the knitting machine 32, the take-away conveyor 36 and also the feed conveyor 34 is generally indicated at 46 and constitutes a motor 48 or other suitable prime mover suitably fastened on a horizontal rigid frame platform 50 which is rigidly joined to the framework 26.

With continued reference to Figures 1–3, the feed conveyor 34 comprises an endless belt 52 which passes around a tubular drive roll 54 and a tubular guide roll 56 and over a tubular supporting idler roll 58. The drive roll 54 is non-rotatably mounted upon a shaft 60 which is suitably journalled in bearings (not shown) secured or formed in the brackets 61 of frame extension 44. This drive roll 54 underlies and is spaced laterally apart from the rolls 56 and 58 below the longitudinal axis thereof to provide for an inclined conveying plane feeding to the knitting and kneading machine 32. The guide roll 56 and supporting idler roll 58 are non-rotatably mounted on shafts 64 and 66 respectively which, in turn, are journalled in bearings (not shown) suitably secured or formed in the framework 26. The rolls 56 and 58 are spaced laterally apart in the same horizontal plane to form a horizontal conveying portion leading from the molding machine 20. Mounted on adjacent ends of the rolls 56 and 58 are two sprocket wheels 68 and 70 respectively, around which an endless belt drive 72 passes to synchronize the angular speed of the support roll 58 with the angular speed of the guide roll 56.

The take-away conveyor 36 comprises an endless cloth or composition belt 74 preferably fabricated from neoprene which passes around a tubular drive roll 76 and a tubular guide roll 78 spaced laterally apart from the drive roll to provide for a substantially horizontal conveying surface for the steak patties between the knitting machine 32 and the ramp 42. These rolls 76 and 78 are respectively non-rotatably mounted on shafts 80 and 82. Shaft 80 is journalled in bearings 84 (Figure 1) formed in brackets 86 which are secured to the extension frame 44 by suitable means. The shaft 82 similarly is journalled in bearings (not shown) suitably formed in or secured to the extension frame 44. Between the rolls of 76 and 78, a drive pulley 88 is suitably keyed to a shaft 90 (Figure 1) which is journalled in suitable bearings (not shown) formed in a bracket 92 (Figure 2) preferably joined to the extension frame 44 as by suitable means. A suitable belt 93 passes around the drive pulley 88 and a driven pulley 94 (Figure 3) which is non-rotatably mounted on shaft 80.

The motor 48, constituting the drive for the conveyors 34 and 36 is provided with a rotor shaft 96 which carries at its exposed end a drive pulley 98. The motor drive pulley 98 (Figures 2 and 3) is connected with pulley 88 by a suitable belt 100 which passes over the pulley 88 and around a flywheel pulley 102. The flywheel pulley is non-rotatably mounted on the shaft 60 that extends transversely of the conveyors 34 and 36.

The knitting and kneading machine 32 is preferably angularly disposed between the feed conveyor 34 and the take-away conveyor 36 at substantially the same angle of inclination as the inclined end of the feed conveyor 34 and is driven by the shaft 60 which receives its drive from the motor 48 as will be described.

Referring now to Figures 4–15, the knitting machine 32 illustrated therein comprises a pair of toothed knitting plate assemblies 112 and 114. Since both of the plate assemblies 112 and 114 are identical a detailed description of one will suffice. Thus, the plate assembly 112 comprises a carriage frame 116 which is built up from suitable plates or other structural forms and which is provided with a pair of parallel spaced plates 118 and 120 (Figure 4) spaced laterally apart. A pair of spaced parallel members 122 and 124 are provided between the plates 118 and 120 and are secured thereby by welding or other suitable means intermediate the ends of the plates to form a recessed rectangular frame for receiving a blade assembly 126 (Figures 6–8) which is removably fastened to the carriage 116 by pins 127 or other suitable means.

Figure 6:
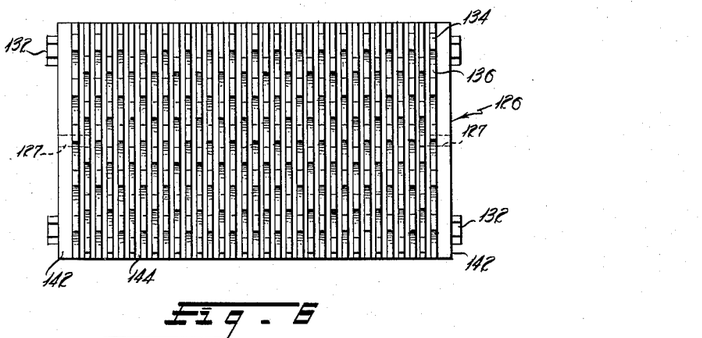
Figure 6 is an enlarged top plan view of the knitting machine blade assembly.
Figure 7:
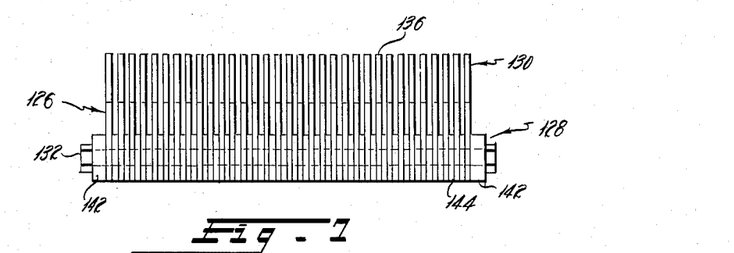
Figure 7 is a front elevation of the blade assembly illustrated in Figure 6.
Figure 8:
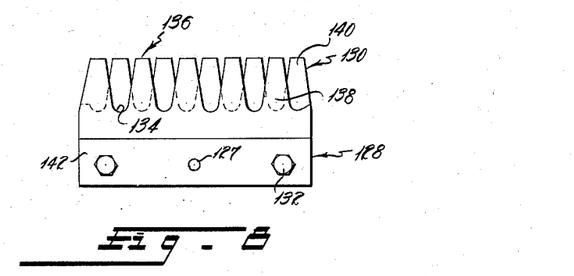
Figure 8 is a side elevation of the blade assembly illustrated in Figure 6.
Figure 9:
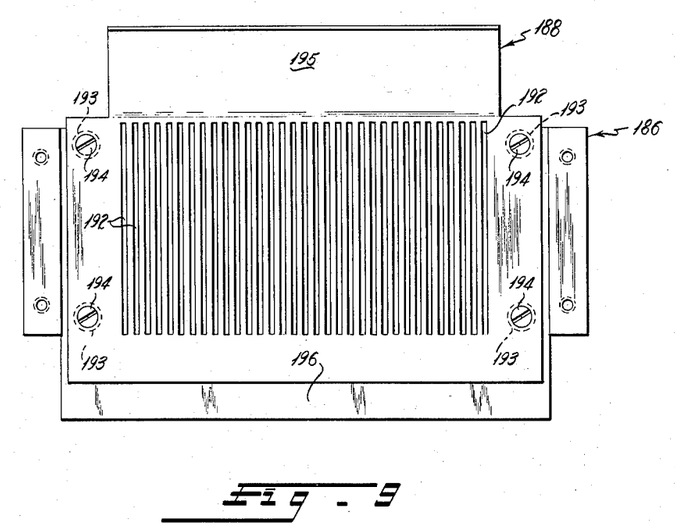
Figure 9 is an enlarged top plan view of the knitting machine guide plates.
Figure 10:
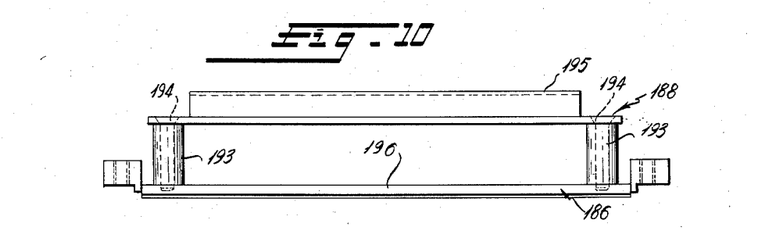
Figure 10 is a front elevation of the guide plates illustrated in Figure 9.
Figure 11:
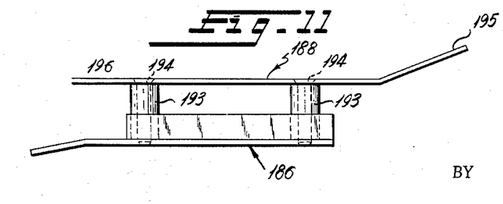
Figure 11 is a side elevation of the guide plates illustrated in Figure 9.

With continued reference to Figures 6–8, the blade assembly 126 constitutes a frame 128 and a series of parallel rows of blades 130 spaced laterally apart in the frame and secured thereto by bolts 132. These blades 130 each are formed from a comparatively thin rectangular plate which is equidistantly notched as at 134 to form teeth-like projections 136 along the inwardly facing elongated side of the rectangular plate which projects beyond the frame 128. These teeth-like projections 136 are staggered so that only alternate rows of teeth will be aligned in a transverse direction while the teeth in any one row are offset substantially equidistant between the teeth members on the adjacent row thus forming a checkered network of these teeth-like members. Each notched out tooth projection 136 converges towards its projected end to form a relatively wide base portion 138 and a straight tooth end 140 of smaller chord length than the base.

The frame 128 is formed with a pair of opposed rectangular bracket plates 142 at each end of the blade assembly 126 adjacent to the outer rows of blades 130. To space each blade row 130 laterally apart from its adjacent row, plate members 144 are disposed between the blades. The blades 130, end plates 142 and plate members 144 are all rigidly fastened together by bolts 132 which extend through aligned holes formed in the base of the blades 130, the end plates 142 and the plate members 144.

Figure 4:
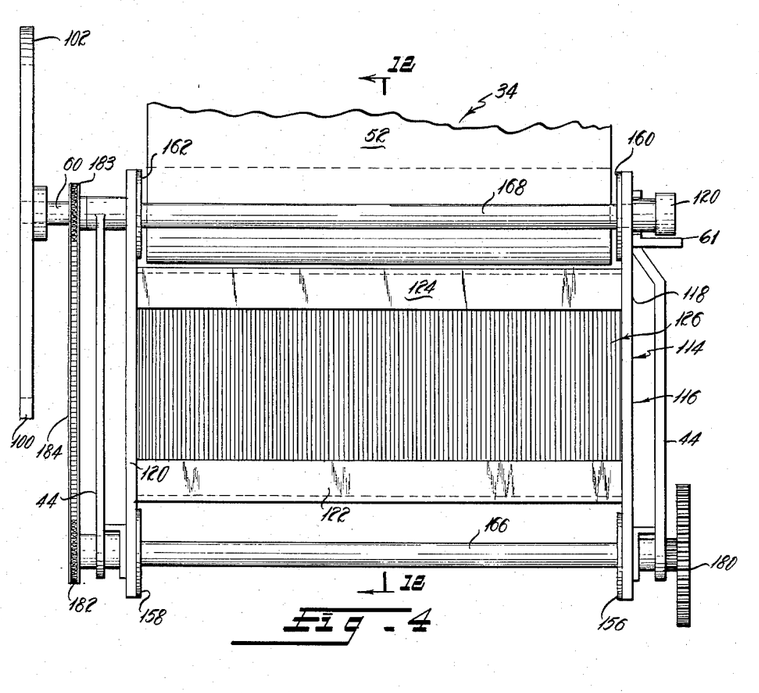
Figure 4 is an enlarged partial plan view of the apparatus substantially along line 4—4 of Figure 1.
Figure 5:
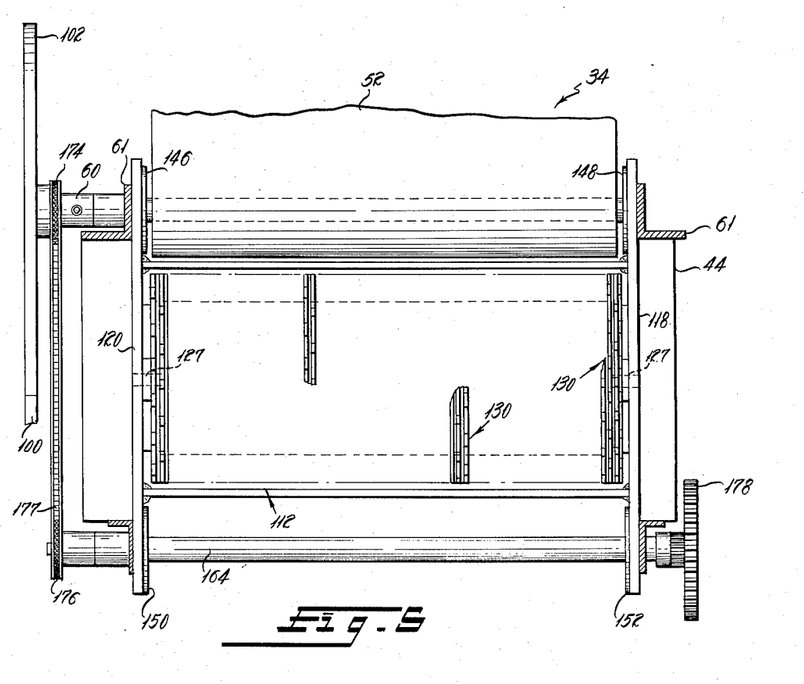
Figure 5 is an enlarged section substantially along line 5—5 of Figure 1 with the guide plates removed.

The lower knitting plate assembly 112 is rotatably mounted on four cam disks 146, 148, 150 and 152 (Figure 5) which are journalled in sockets formed one near each end of the carriage plates 118 and 120. Similarly, the upper knitting plate assembly 114 is mounted for rotational movement about cam disks 156, 158, 160 and 162 (Figure 4). The cam disks 146 and 148 are eccentrically mounted on the shaft 60 for rotation therewith to provide an eccentric crank. Cam disks 150 and 152 similarly are eccentrically and non-rotatably mounted on shaft 164 which is journalled in suitable bearings (not shown) formed or secured in the frame 44 so as to provide an eccentric crank for the lower end of the carriage frame of plate assembly 112.

The cam disks 156 and 158 of the upper knitting plate assembly are eccentrically mounted on shaft 166 which overlies shaft 164 while the cams 160 and 162 are similarly mounted on a shaft 168 which overlies shaft 60 to provide an eccentric crank for the upper plate assembly 114. This shaft 166 is journalled in suitable bearings (not shown) formed or secured in the frame 44. The shaft 168 is journalled in bearings 170 which are removably fastened by any suitable means in recess 172 formed in the projecting end of brackets 61. Thus, to facilitate quick removal of the blade assemblies 126 for cleaning or replacement, the upper knitting plate assembly is lifted from the supporting brackets 61 and pivoted about the shaft 166 exposing both blade assemblies 126.

All four shafts 60, 164, 166 and 168 are parallel, with shafts 60 and 164 disposed in a plane parallel to the plane in which shafts 166 and 168 are disposed.

In order to synchronize movement of both the upper and lower knitting plate assemblies 112 and 114 so that both plate assemblies orbit at the same speed, a sprocket wheel 174 (Figure 5) is non-rotatably mounted on the shaft 60 between the knitting plate assemblies and the flywheel 102. On the same side of the knitting plate assemblies a sprocket wheel 176 (Figure 5) is non-rotatably mounted on shaft 164. An endless chain belt 177 passes around the sprocket wheels 174 and 176 to drive connect the shaft 164 with the shaft 60 so that the rotation of both shafts is synchronized. A gear wheel 178 of any suitable type is keyed to shaft 164 at the other end from the sprocket wheel 176. This gear wheel 178 meshes with a gear wheel 180 non-rotatably mounted on shaft 166 at one end thereof to drive the shaft 166 in a direction opposite to shaft 164. At the other end of the shaft 166, a sprocket wheel 182 (Figure 4) is keyed and at the corresponding adjacent end of shaft 168, a sprocket wheel 183 is non-rotatably mounted. An endless chain belt 184 passes around sprockets 182 and 183 to drive shaft 168 from shaft 164 at the same speed.

Thus, the shaft 60 is drive connected to shafts 164, 166 and 168 so that all the shafts supporting the upper and lower knitting plate assemblies 112 and 114 are all rotated at the same speed as the shaft 60. The knitting plate assemblies consequently move in parallel spaced apart counter orbital paths of elliptical shape and since the shafts 60, 164, 166 and 168 are parallel and rotate at the same speed, the knitting plate assemblies will be parallel to and directly opposite each other at any given instant during movement along their respective elliptical paths in opposed rotational directions.

In order to guide the blade rows as they move to penetrate the meat fed into the knitting machine 32 and to form a guide passageway 185 for the patties passing therethrough, a pair of parallel comb-like guide plates 186 and 188 (Figures 9–11) are spaced laterally apart between the upper and lower knitting plate assemblies 112 and 114. These comb-like guide plates 186 and 188 are formed with a series of elongated slots 192 which align respectively with the blade rows 130 on the knitting plate assemblies 112 and 114. The lower comb-like plates 186 are removably fastened to the frame by bolts (not shown) or any other suitable means and is provided with spaced upstanding posts 193 upon which the upper comb-like guide plate 188 is mounted by machine screws 194 or the like. The upper guide plate 188 is formed at the inlet with an upwardly inclined lip 195 to facilitate introduction of the ground meat patty into the guideway 185. The outlet end of the guide plate 186 is formed with a downwardly inclined lip 196 which directs the finished steak product on to the take-away conveyor 36.

In operation, the ground meat to be rebuilt is fed into the molding machine 20 which discharges selected quantities at predetermined intervals to be shaped into a selected form and ejected on to the feed conveyor 34 by the shaping and ejecting mechanism 25. The conveyor which is continuously being driven by motor 48 carries the ground meat patties to the mouth of the kneading and knitting machine 32 formed by the comb-like guide plates 186 and 188.

As each patty is fed into the knitting machine 32, the blade rows as they move through the slots in the comb-like plates penetrate into the patty and propel it along the passageway. The teeth projections of the blade rows penetrate into the patties and apply several series of spaced compressions of selected predetermined depth to the fibers of the meat on both faces along substantially linear areas to knead and knit the stringy fibers together at the areas compressed. Since the motion of the blade rows is along the flat elongated portion of the elliptical path of the orbiting knitting plate assemblies when the meat patties are being penetrated by the teeth of the blade rows, the compressions formed thereby are elongated, the extended length of which is greater than the length of the teeth themselves. These teeth being dull do not sever the meat fibers or pierce the patty as they penetrate into the meat but rather compress the patty along subsantially linear areas to form an integrated intermingled coherent knitted texture of ground meat fibers.

Figure 12:
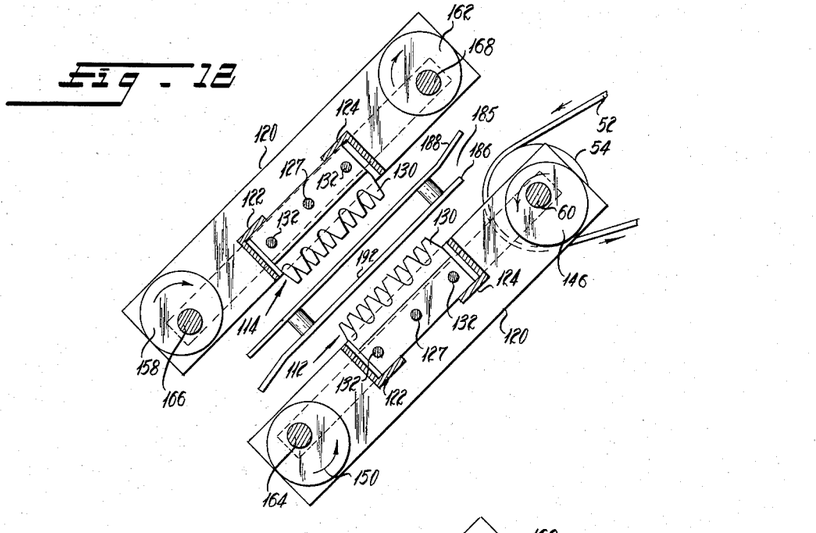
Figure 12 is a section substantially along line 12—12 of Figure 4 illustrating only the upper and lower plate assemblies of the knitting machine.
Figure 13:
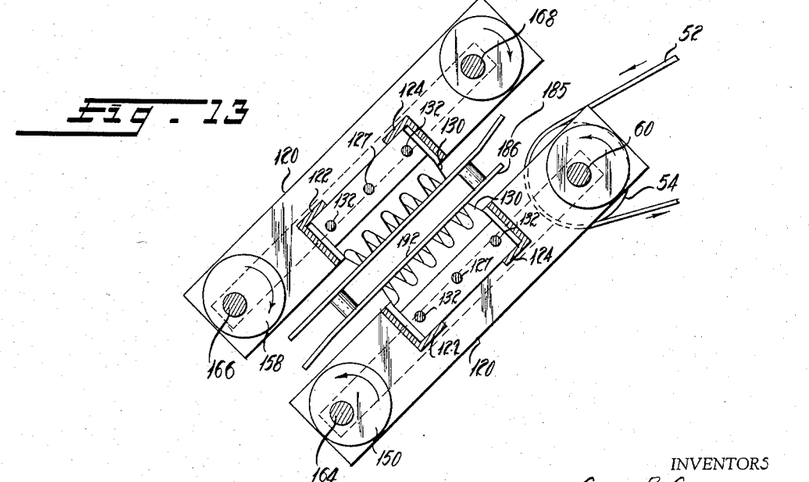
Figure 13 is a section similar to Figure 12 with the knitting machine plate assemblies in a second position with the driving eccentric cams rotated substantially 90° in a clockwise direction from the position indicated in Figure 12.

The movement of the knitting plate assemblies 112 and 114 to accomplish the kneading and knitting of the ground meat fibers is illustrated in four positions as illustrated in Figures 12–15. With reference to Figure 12, the knitting plate assemblies therein illustrated are positioned on the outer portion of the perimeter of the elliptical path coincident with the minor axis defined by the elliptical perimeter. The lower knitting plate assembly 112 is shown to be orbiting in a clockwise direction while the upper knitting plate assembly 114 is orbiting in the opposite direction. At this position the teeth 130 are withdrawn from the guide plates 186 and 188 providing a small clearance space therebetween. With reference to Figure 13, now, the knitting plate assemblies 112 and 114 are illustrated to have orbited through one-fourth of their complete path and are now positioned at the upper end of elliptical path coincident with the major axis defined by the elliptical perimeter. The teeth 130 at this position are partially received by the slotted perforations 192 of the guide plates 186 and 188.

Figure 14:
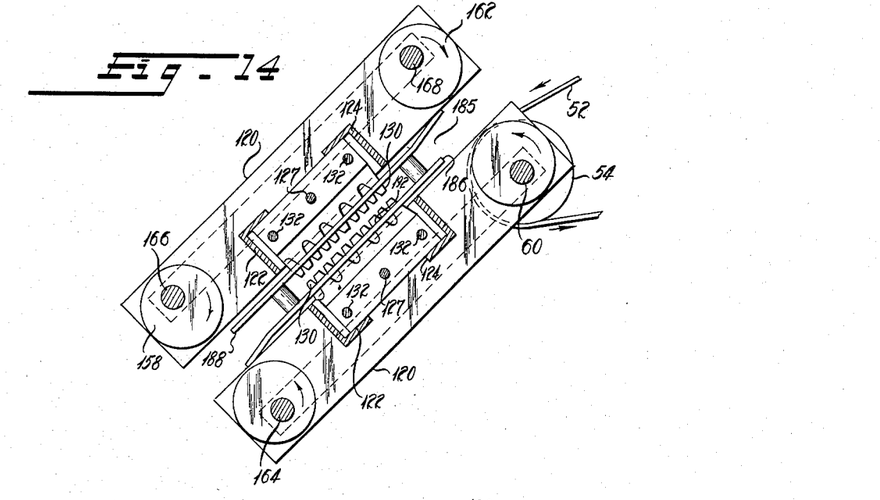
Figure 14 is a section similar to Figure 12 with the knitting machine plate assemblies in a third position with the driving eccentric cams rotated substantially 180° in a clockwise direction from the position indicated in Figure 12.
Figure 15:
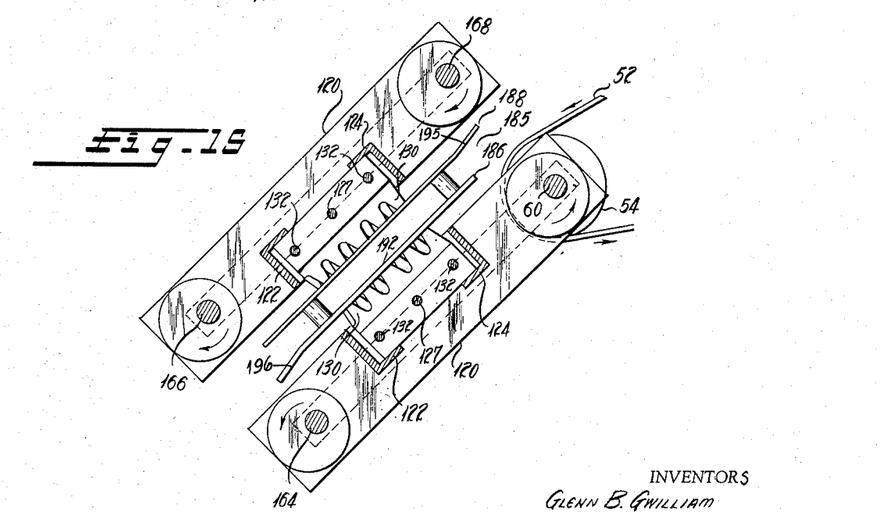
Figure 15 is a section similar to Figure 12 with the knitting machine plate assemblies in a fourth position with the driving eccentric cams rotated substantially 270° in a clockwise direction from the position indicated in Figure 12.

Upon subsequent movement of the knitting plate assemblies, the teeth 130 are extended through the perforations and into the guideway 185 where the teeth engage and compress the meat patties being fed in by the conveyor 34. Figure 14 illustrates the knitting plate assemblies 112 and 114 positioned on the inner portion of the elliptical perimeter again coincident with the minor axis as half of the cycle is completed. The teeth now extend inwardly into the guideway for the greatest depth of penetration. Thereafter, the knitting plate assemblies move outwardly from the guideway 185 until the teeth are completely withdrawn as illustrated in Figure 15. From the position illustrated in Figure 15 where the knitting plate assemblies 112 and 114 are positioned at the lower end of the elliptical path coincident with the major axis defined by the elliptical perimeter, the plate assemblies then begin the return cycle to the position illustrated in Figure 12.

It is apparent from the foregoing that the teeth 130 as they pass through the guide plates 186 and 188 penetrate into the bulk of the ground meat patties to propel it along the guideway 185 and to simultaneously apply compressions along substantially linear areas of the faces of the patty.

Depending upon the texture and quality of the ground meat, the number of series of localized compressions applied to the faces of the patty as it is propelled through the guideway may be varied by changing the speed of the motor by any suitable means (not shown) so that the rebuilt steak product is sufficiently integrated to form a single mass not easily separated. For a four ounce patty, which is the common steak size, it has been found that generally passing the teeth into the opposed faces of the patty eight to nine times to compress the meat fibers and withdraw, is adequate to achive the desired quality of the final knitted product. Additional compressions by the teeth for this size patty has not been found to substantially improve the final steak form as the additional compressions and withdrawals occur substantially at the same points on the steak which has already been compressed.

The finished steak product is discharged from the knitting machine 32 onto the continuous sheet of wrapping paper or cellophane carried by the take-away conveyor 36. The paper underlying the patties is severed between the patties at the far end of the conveyor by the knife cutter (not shown) which is actuated by the timer (not shown) to stroke each time a patty is ejected from the forming machine 20.

The patties now with their individual wrappers are propelled off the end of the take-away conveyor to the ramp 42 which deposits the steak product at a wrapping station ready to be wrapped and transported to refrigerated storage.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The apparatus for forming ground meat into steaks having the appearance and texture of natural steak comprising means forming a passageway into which one patty after another of ground meat is fed in spaced succession, and means for repeatedly subjecting the patty in the passageway to a series of spaced multiple area compressions on both sides at the same time comprising opposed toothed members each having a multiplicity of dull ended teeth, said teeth extending toward the passageway and being operative to only compress said patty to produce said multiple area compressions, and means for cyclically moving said toothed members in predetermined closed paths and for causing said tooth members to repeatedly enter and partially cross said passageway from opposite sides thereof to penetrate the patty in said passageway, the teeth of each said member being of such length relative to the width of the passageway and of such correlated travel in said closed paths that they penetrate only partly into the patty being compressed therebetween.

2. The apparatus defined in claim 1 wherein said toothed members comprise a pair of parallel counterorbiting plates movable at the same speed in parallel spaced apart elliptical paths, one on each side of said passageway, said teeth associated with each of said members being carried by each of said plates in parallel staggered rows to extend into and movable in substantially a straight longitudinal direction along said passageway.

3. The apparatus defined in claim 1 wherein said passageway forming means comprises a pair of parallel spaced apart plates associated one with each of said toothed members and fixedly mounted in the space between said toothed members, said plates having a plurality of slotted perforations for passing and guiding the teeth of said toothed members into and out of said passageway.

4. In a device for compressing, kneading and interlocking fibers of raw ground meat, a pair of parallel spaced apart guide plates forming a through guideway for bodies of ground meat fed thereto in spaced succession and having a plurality of parallel slotted perforations extending in the direction of movement of the meat bodies through the guideway; and means guided by said perforated plates for simultaneously incrementally propelling the meat body fed into said guideway and for applying to both sides of the meat as it is propelled along said guideway a plurality of spaced compressions along substantially linear areas to effectively knit and bind together said fibers at said areas comprising a pair of parallel counterorbiting toothed members spaced laterally apart adjacent the outer faces of said guide plates and movable at the same speed in spaced apart parallel elliptical paths, each of said toothed members having a series of dull edged teeth projecting toward said guideway, and said teeth being movable in and out of the perforations in said guide plates during movement along a substantially linear part of said elliptical paths sufficiently to partly penetrate and compress but not cut through the meat body.

5. In the device defined in claim 4 each of said teeth series comprising a plurality of parallel staggered rows of teeth extending toward the guideway to form a checkered network of compressions on opposed faces of said meat.

6. In an apparatus for rebuilding raw ground meat portions into an integral steak product of coherent knitted texture, a pair of substantially parallel spaced apart fixed perforated guide plates forming a through guideway for said meat portion and means associated with said guide plates for simultaneously propelling said meat portion along said guideway and for applying to said meat portion a series of spaced compressions along substantially linear areas on opposed faces of the meat to effectively knit and bind together the fibers thereof at said areas comprising a pair of parallel counterorbiting toothed members movable in the same direction and at the same speed in parallel spaced apart closed paths, each of said toothed members having a multiplicity of parallel dull ended teeth extending toward the guideway and adapted during movement over a portion of said path to extend through said guide plate perforations sufficiently to partially penetrate the meat portion at both sides at the same time.

7. In the apparatus defined in claim 6, said toothed members each being mounted in support frames, one of which is fixedly mounted and the other of which has a pivot mount at one side so that said other frame may be swung to expose the teeth thereof and the guide plates for cleaning.

8. In the apparatus defined in claim 7, said means for moving said toothed members in their respective paths including interconnected drive trains having meshed gears on the respective frames and providing the connection between said drive trains, and said pivot mount being coaxial with one of said gears.

References Cited in the file of this patent

UNITED STATES PATENTS

| | | |
|---|---|---|
| 376,080 | Franklin | Jan. 10, 1888 |
| 2,069,696 | Burk | Feb. 2, 1937 |
| 2,323,769 | Hansen | July 6, 1943 |
| 2,527,038 | Stukart | Oct. 24, 1950 |